United States Patent
Hug

(10) Patent No.: US 11,441,965 B2
(45) Date of Patent: Sep. 13, 2022

(54) AUTONOMOUS AND IRREVERSIBLE PRESSURE VARIATION DETECTOR

(71) Applicant: Christian Hug, Shanghai (CN)

(72) Inventor: Christian Hug, Shanghai (CN)

( * ) Notice: Subject to any disclaimer, the term of this patent is extended or adjusted under 35 U.S.C. 154(b) by 119 days.

(21) Appl. No.: 16/906,677

(22) Filed: Jun. 19, 2020

(65) Prior Publication Data

US 2020/0400524 A1 Dec. 24, 2020

(30) Foreign Application Priority Data

Jun. 20, 2019 (FR) .................................. 1906646

(51) Int. Cl.

| | |
|---|---|
| *G01L 23/02* | (2006.01) |
| *G01L 13/00* | (2006.01) |
| *H01H 35/26* | (2006.01) |
| *H01H 35/24* | (2006.01) |
| *G01L 19/06* | (2006.01) |
| *G01L 23/32* | (2006.01) |
| *G01L 11/00* | (2006.01) |
| *F16K 37/00* | (2006.01) |

(52) U.S. Cl.
CPC ............. *G01L 23/02* (2013.01); *G01L 13/00* (2013.01); *F16K 37/00* (2013.01); *G01L 11/00* (2013.01); *G01L 19/0645* (2013.01); *G01L 19/0672* (2013.01); *G01L 23/32* (2013.01); *H01H 35/24* (2013.01); *H01H 35/2657* (2013.01)

(58) Field of Classification Search
CPC ..... G01L 23/02; G01L 13/00; G01L 19/0645; G01L 19/0672; G01L 23/32; G01L 11/00; F16K 37/00; F16K 17/1633; H01H 35/2657; H01H 35/24

See application file for complete search history.

(56) References Cited

U.S. PATENT DOCUMENTS

| | | | |
|---|---|---|---|
| 2,788,794 A | 4/1957 | Holinger | |
| 4,978,947 A * | 12/1990 | Finnegan | ............ F16K 17/1606 340/611 |
| 5,121,847 A * | 6/1992 | Ellis | ..................... F16K 17/1633 220/203.08 |
| 5,313,194 A | 5/1994 | Varos | |

(Continued)

FOREIGN PATENT DOCUMENTS

| | | |
|---|---|---|
| DE | 102011078878 A1 | 1/2013 |
| GB | 1033035 A | 6/1966 |

OTHER PUBLICATIONS

European Search Report and Written Opinion; European Patent Application No. 20180629.6; Published Nov. 9, 2020, 7 pages.

(Continued)

*Primary Examiner* — Randy W Gibson
*Assistant Examiner* — John M Royston
(74) *Attorney, Agent, or Firm* — Dilworth IP, LLC

(57) ABSTRACT

A device for detecting a sudden pressure variation in a fluid, including a housing open at one of its ends, a wall closing the housing to create a chamber, the wall being configured such that, when the external pressure outside the chamber is substantially stable or varies slowly, the internal pressure of the chamber is close to the external pressure, and the wall having mechanical characteristics such that it breaks when subjected to a predetermined difference between the external pressure and the internal pressure.

17 Claims, 2 Drawing Sheets

(56) References Cited

U.S. PATENT DOCUMENTS

| | | | |
|---|---|---|---|
| 9,625,102 B2* | 4/2017 | Forkl, III | F17C 13/04 |
| 2005/0022583 A1* | 2/2005 | Weigel | F16K 37/00 |
| | | | 73/37 |
| 2007/0286682 A1* | 12/2007 | Freyer | F16L 55/26 |
| | | | 405/184.1 |
| 2018/0040926 A1 | 2/2018 | Keser et al. | |
| 2018/0180504 A1* | 6/2018 | Uehlin | G01L 19/0672 |
| 2020/0200611 A1* | 6/2020 | Praharaj | B32B 27/08 |

OTHER PUBLICATIONS

Search Report and Written Opinion issued in French Patent Application No. FR 1906646, dated Mar. 3, 2020, 8 pages.

* cited by examiner

[FIG. 1]
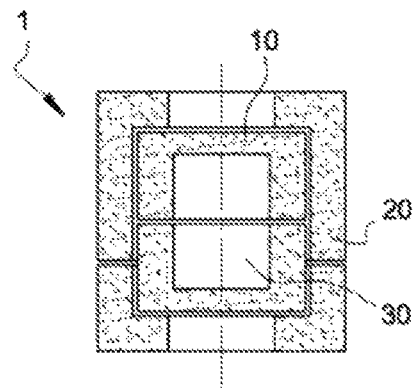
[FIG. 2]
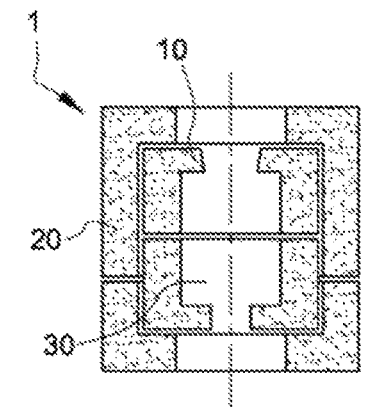
[FIG. 3]
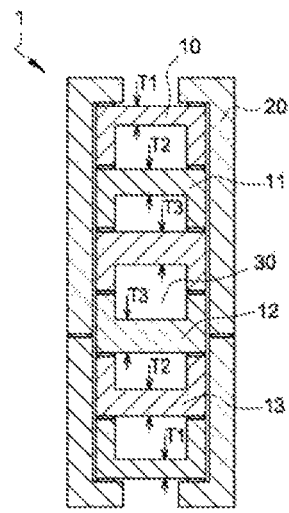 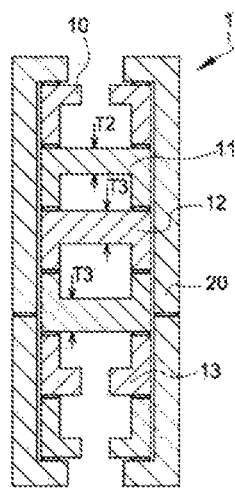
Fig. 3a    Fig. 3b

[FIG. 4]
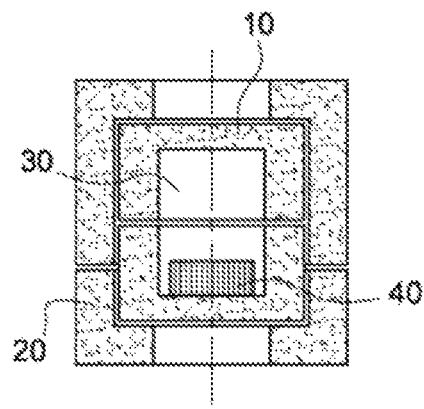
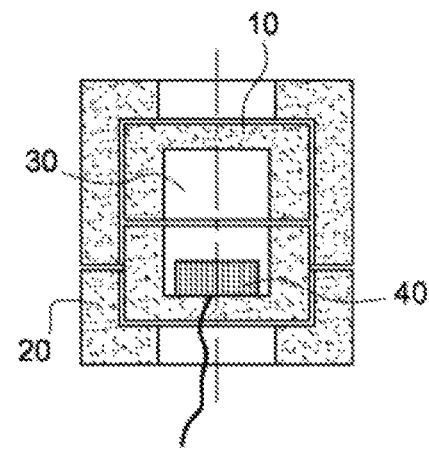
Fig. 4a                Fig. 4b
[FIG. 5]
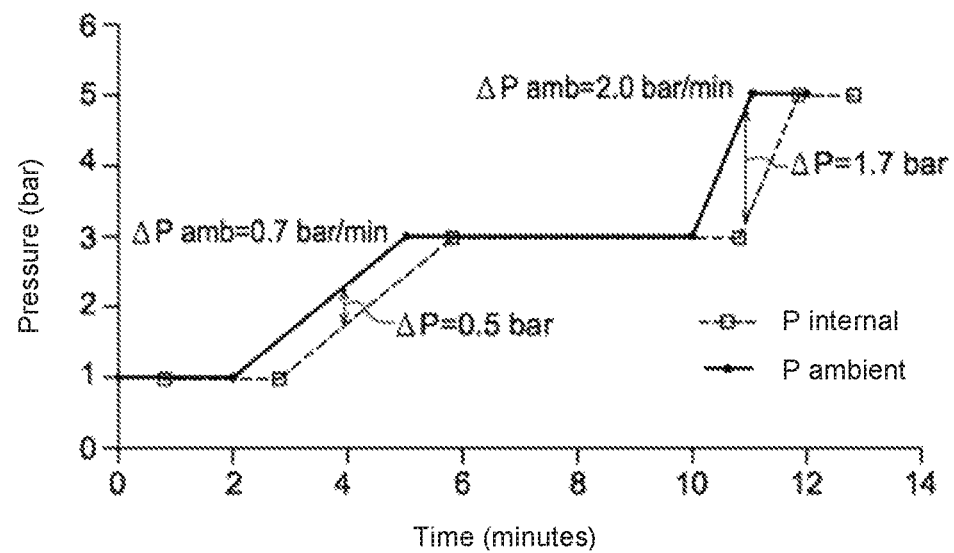

AUTONOMOUS AND IRREVERSIBLE PRESSURE VARIATION DETECTOR

FIELD OF THE INVENTION

The invention relates to a detector of a sudden pressure variation in a fluid, and more particularly an irreversible detector of pressure variation in a fluid.

BACKGROUND

In many fields, the detection of an overpressure in industrial equipment is necessary for safety reasons or to prevent deterioration of the equipment. This detection can be done by different types of sensors. One known type of sensor comprises a membrane or diaphragm that deforms under the effect of a pressure increase on one of its faces, and a deformation measuring means that makes it possible to determine the value of the pressure increase. Another way to detect an overpressure is by using a rupture disc. In particular, it has been known in the prior art, from document U.S. Pat. No. 5,313,194, that a device for detecting an overpressure which works by rupture of a membrane or a material wall. This device comprises a rupture disc which comprises an electrically conductive membrane and a housing, and which is connected by conductive wires to a signal generating circuit. Thus, in normal operation, the electric current passes through the disc and goes from one electric wire to another. The detection of an overpressure is done by rupture of the disc, which leads to a cut-off in the electrical circuit formed by the wires and the disc. This device therefore makes it possible to easily and irreversibly detect an overpressure in an industrial equipment item.

However, these devices make it possible to detect that a predetermined pressure threshold value has been exceeded, but do not make it possible to detect sudden variations of the pressure that may damage the equipment. Furthermore, their construction implies that they would be damaged if they were placed in corrosive environments or if they were subjected to high temperatures.

SUMMARY

Thus, the object of the invention is in particular to provide a simple device making it possible to effectively detect sudden pressure variations in a fluid.

Preferably, the device according to the invention is inexpensive and withstands both high temperatures and corrosive environments.

To that end, the invention relates to a device for detecting a sudden pressure variation in a fluid, comprising:
 a housing open at one of its ends,
 a wall closing the housing to create a chamber,
 the wall being configured such that, when the external pressure outside the chamber is substantially stable or varies slowly, the internal pressure of the chamber is close to the external pressure,
 and the wall having mechanical characteristics such that it breaks when subjected to a predetermined difference between the external pressure and the internal pressure.

According to the invention, the term "sudden variation" means a very rapid and unforeseen pressure variation. Conversely, "varies slowly" means that the variation is not sudden. Such a non-sudden variation takes place over a relatively long time period or under variation conditions that are foreseen in advance and correspond to an operation without anomaly of the industrial equipment.

The pressure variation detection device detects sudden drops of pressure as well as sudden increases.

Thus, the pressure variation detection device has a simple design, while being able to be calibrated to break at predetermined pressure variations. In addition, it does not require fixing means on the equipment item in which it detects pressure variations and can be simply placed in the equipment item.

According to other optional features of the device for detecting a sudden pressure variation in a fluid taken alone or in combination:
 the wall is porous. The porosity of the wall allows the internal and external pressures of the chamber to be balanced. The porosity can be chosen to balance the pressures "slowly", while allowing a rupture when the variation is sudden, because the pressures will not be able to balance out quickly enough to avoid a pressure difference on either side of the wall, leading to its rupture;
 the wall comprises graphite impregnated with a resin, preferably with a phenolic resin. The graphite impregnated with a phenolic resin has adequate mechanical properties for rupture during pressure deviations. In addition, it is particularly well suited for being used in corrosive environments and at high temperatures. Lastly, its porosity can be chosen to allow pressure to be balanced slowly;
 the wall consists exclusively of graphite impregnated with a resin, preferably with a phenolic resin. This further increases the ability of the device to be used in corrosive environments.
 the device comprises several walls having different thicknesses from one another. The advantages of this feature will be understood in the light of the example described below.
 the walls are positioned in order of increasing thickness, and the thinnest wall is located furthest at outside. This feature makes it possible to detect increasingly great pressure variations;
 the device further comprises a measuring device positioned in the chamber. The measuring device positioned in the chamber makes it possible to measure a useful additional parameter at the time of the rupture of the wall or just after, for example a pressure, a temperature, a time;
 the measuring device positioned in the chamber is a timestamping machine. Thus, it is possible to determine the precise moment at which the sudden pressure variation occurred which caused the wall to break;
 the measuring device positioned in the chamber is a pressure sensor. Thus, it is possible to determine the maximum value of the pressure when the wall breaks, in addition to the value of the variation;

In addition, the measuring device positioned in the chamber can be for single use, and is triggered when the wall breaks.

BRIEF DESCRIPTION OF THE FIGURES

The invention will be better understood upon reading the description which follows, given solely by way of example and with reference to the appended drawings in which:
 FIG. 1 is a schematic sectional view of a device according to a first embodiment of the invention.
 FIG. 2 is a view of the device of FIG. 1 after rupture of the wall.

FIGS. 3a and 3b are schematic sectional views of a device according to a third embodiment of the invention, comprising several rupture walls. FIG. 3a shows the walls before rupture, FIG. 3b show certain walls after rupture and others still intact.

FIGS. 4a and 4b are schematic sectional views of a device according to a fourth embodiment of the invention, comprising an additional sensor placed in the chamber.

FIG. 5 shows examples of variation curves of the internal pressure and the external pressure for a particular wall.

DETAILED DESCRIPTION

FIGS. 1 and 2 show a device for detecting pressure variations according to a first embodiment, designated by general reference 1.

The device 1 according to the invention makes it possible to detect sudden pressure variations in a fluid, or in other words, in a gaseous or liquid medium. The device 1 is installed in an industrial equipment item that may be damaged by sudden variations of the pressure of a fluid used in this equipment item.

FIG. 1 shows an embodiment of the device 1 before rupture. The device 1 comprises a cylindrical housing 20 open at its two opposite ends, and a wall of revolution 10 closing the housing 20 at each of the open ends, to create a chamber 30. The housing 20 holds the wall 10 and protects it. The cylindrical shape of the device 1 of FIG. 1 is an exemplary illustration, and the device 1 can be in any shape which allows the housing 20 to be open at least at one of its ends and the wall 10 to close this end. For example, the housing 20 can have a total height of around 35 mm, and an outside diameter of around 35 mm as well. Still by way of example, the internal diameter of the housing 20 can be on the order of 15 mm.

In addition, the housing 20 can be in different forms so that it can be fixed in the medium in which the device 1 is used. In particular, it is possible to add eyelets, buckles to allow the device to be attached on a part of the equipment item in which it is used, for example a wall of the equipment item. It is understood, however, that these means are not necessary and that the device 1 can simply be placed in the equipment item inside which it detects pressure variations.

FIG. 2 shows a device 1 after rupture of the wall 10. The wall 10 breaks when the pressure of the fluid outside the chamber 30 exceeds the pressure inside the chamber 30 by a predetermined value. Since the wall is configured such that, when the pressure outside the chamber is substantially stable or varies slowly, the internal pressure of the chamber is close to the external pressure, such a pressure difference can only occur if the pressure outside the chamber changes suddenly. This is made possible by appropriate mechanical characteristics of the material(s) making up the wall 10.

The wall 10 is in fact configured in such a way that, when the external pressure outside the chamber 30 is substantially stable or varies slowly, the internal pressure of the chamber 30 is close to the external pressure. This feature is for example obtained owing to a porous wall, the porosity of which is chosen to allow the pressure to be balanced between the inside and the outside of the chamber 30 under substantially stable pressure conditions in the equipment item in which the device 1 is installed.

The porosity of the wall 10 is also small enough that when the external pressure variation is sudden, the external and internal pressures of the chamber 30 do not instantly balance out. Therefore, in this case the wall 10 is subjected to a significant pressure differential, causing a force greater than its rupture threshold. The porosity is chosen as a function of the pressure variations that it is desired to detect, but also as a function of the medium in which the device 1 is placed.

In one embodiment, the calibration of the rupture pressure variation speed that can be detected by the device 1 is carried out by choosing the thickness of the wall 10 so that its mechanical rupture occurs for a predetermined pressure variation speed between the two faces of the wall.

The device 1 is preferably small. In this way, it is well suited for being placed in all types of equipment that may undergo pressure variations, in order to monitor the maximum pressure variation speed to which it is subjected. This is particularly useful for equipment subjected to mechanical guarantees of resistance to sudden pressure variations. The device 1 thus makes it possible to determine whether the damage to an industrial equipment item, for example piping, is due to a manufacturing defect in the equipment under pressure or is due to improper use of the equipment having caused a sudden pressure variation, such as during a water hammer or improper control of a pump. This is therefore particularly useful for defining liability in the event of a damage problem in order to apply warranties or obtain insurance coverage.

Advantageously, the device 1 is made of materials that allow very high corrosion and temperature resistances, which makes the device 1 usable in most industrial equipment. Preferably, the wall 10 comprises graphite impregnated with a resin, preferably a phenolic resin. In fact, the impregnated graphite has corrosion and temperature resistances that make it particularly suitable for manufacturing the wall 10 of the device 1.

In a particular embodiment, the wall 10 consists exclusively of graphite impregnated with a resin. This makes it more resistant to corrosion and high temperatures.

By way of example, to manufacture a device 1 for detecting a sudden pressure variation that is sensitive to a pressure variation of 2 bar/minute, a rupture wall 10 made from impregnated graphite with a thickness of 0.9 mm and a diameter of 15 mm can be used. This thickness of 0.9 mm corresponds to a rupture at a standard temperature of 20° C. of 1.7 bar, which has been verified by tests carried out on a sample of the material used to manufacture the device.

Thus, when the device 1 thus manufactured is subjected to a variation in the pressure outside the chamber 30 greater than 2 bars/minute, the pressure differential between the inside of the chamber 30 and the outside of the chamber 30 is greater than 1.7 bar and causes the wall 10 to rupture.

For information, examples of curves illustrating the impact of the speed at which the external pressure (or ambient pressure) changes on the pressure difference between the fluid under the wall 10 and the outside fluid are shown in FIG. 5.

In other embodiments, the wall 10 is made of a metal that withstands corrosion and the high temperatures of the medium in which it is immersed during use.

The housing 20 can also include graphite, or any other material withstanding corrosion and high temperatures, for example a ceramic, or a metal or a metal alloy such as stainless steel, or titanium.

Advantageously, the device 1 is freely placed in a space of the equipment item in which it is subjected to the pressure variations of the method or of the equipment item that it controls.

It will be noted that, unlike the rupture discs frequently present on industrial equipment, the function of the device 1 is not to release the pressure by creating an opening on an expansion space. Its function is to serve as a pressure indicator, for example in the event of a dispute over an equipment warranty or for checking the pressure on methods using liquids or gases.

The device 1 makes it possible to keep track of a single event. It must be replaced after rupture caused by the pressure variation for which it was calibrated.

The rupture of the wall 10 of the device 1 is irreversible and extremely fast. The response time of the device 1, due to the material used, makes it a device very sensitive to very short-lasting pressure spikes, for example on the order of a millisecond.

During use, the operator of the equipment in which the device 1 is placed defines the visual inspection frequency of the device. The device 1 is thus periodically removed from the space of the equipment in which it is placed for visual inspection. If there is no damage, it is put back in place. If the wall 10 is broken, the device 1 is replaced with a new device.

FIG. 3 shows another embodiment of the device 1. In this embodiment, the device 1 comprises several walls 10, 11, 12 having thicknesses that are different from one another. Advantageously, the walls are positioned in order of thickness, and the thinnest walls are located furthest at outside of the chamber 30. This embodiment makes it possible to detect different pressure variations. This can be useful if one knows that in certain equipment items, the damage is different depending on the pressure variation (variation speed and pressure intensity).

FIGS. 4a and 4b show yet another embodiment of the device 1. In this embodiment, a measuring device 40 is positioned in the chamber 30. This measuring device 40 makes it possible to measure an additional parameter when the wall 10 breaks. The device 40 can be a timestamping machine, making it possible, for example, to record the precise moment when the wall 10 broke. The device 40 can also be a "conventional" pressure sensor, providing information on the maximum pressure reached at the time of rupture of the wall 10, in addition to the information on the sudden pressure variation given by the device 1. In the embodiment of FIG. 4a, the measuring device 40 is a wireless device. In the embodiment of FIG. 4b, the measuring device 40 is connected by a wire. The measuring device 40 can be of the single-use type, capable of performing its function only once when it is first brought into contact with the fluid surrounding the device according to the invention. Its protection inside the chamber allows it to take the measurement only when the wall 10 breaks.

The invention is not limited to the embodiments described here, and other embodiments will become clearly apparent to a person skilled in the art.

The invention claimed is:

1. A device for detecting a pressure variation in a fluid, comprising:
    a housing open at one of its ends,
    a wall closing the housing to create a chamber,
    wherein the wall is porous and its porosity is chosen to allow pressure to be balanced between an inside and an outside of the chamber and the wall breaks when the pressure of the fluid outside the chamber exceeds the pressure inside the chamber by a predetermined value.

2. The device for detecting a pressure variation in a fluid according to claim 1, wherein the wall comprises graphite impregnated with a resin.

3. The device for detecting a pressure variation in a fluid according to claim 1, wherein the wall consists exclusively of graphite impregnated with a resin.

4. The device for detecting a pressure variation in a fluid according to claim 1, comprising several walls having different thicknesses from one another.

5. The device for detecting a pressure variation in a fluid according to claim 4, wherein the walls are positioned in order of increasing thickness, and a thinnest of the walls is located furthest at the outside.

6. The device for detecting a pressure variation in a fluid according to claim 1, further comprising a measuring device positioned in the chamber.

7. The device for detecting a pressure variation in a fluid according to claim 6, wherein the measuring device is a timestamping machine.

8. The device for detecting a pressure variation in a fluid according to claim 6, wherein the measuring device is a pressure sensor.

9. The device for detecting a pressure variation in a fluid according to claim 1, wherein the wall comprises graphite impregnated with a resin.

10. The device for detecting a pressure variation in a fluid according to claim 2, wherein the wall resin is a phenolic resin.

11. The device for detecting a pressure variation in a fluid according to claim 1, wherein the wall consists exclusively of graphite impregnated with a resin.

12. The device for detecting a pressure variation in a fluid according to claim 3, wherein the resin is a phenolic resin.

13. The device for detecting a pressure variation in a fluid according to claim 2, comprising several walls having different thicknesses from one another.

14. The device for detecting a pressure variation in a fluid according to claim 13, wherein the walls are positioned in order of increasing thickness, and a thinnest of the walls is located furthest at the outside.

15. The device for detecting a pressure variation in a fluid according to claim 1, further comprising a measuring device positioned in the chamber.

16. The device for detecting a pressure variation in a fluid according to claim 2, further comprising a measuring device positioned in the chamber.

17. A device for detecting a pressure variation in a fluid, comprising:
    a housing open at one of its ends,
    a wall closing the housing to create a chamber,
    a measuring device positioned in the chamber, the measuring device being a timestamp machine,
    the wall being configured such that, when an external pressure outside the chamber is stable or is varying below a predetermined pressure variation rate, an internal pressure of the chamber balances with the external pressure, and
    the wall having mechanical characteristics such that it breaks when subjected to a predetermined difference between the external pressure and the internal pressure.

* * * * *